UNITED STATES PATENT OFFICE.

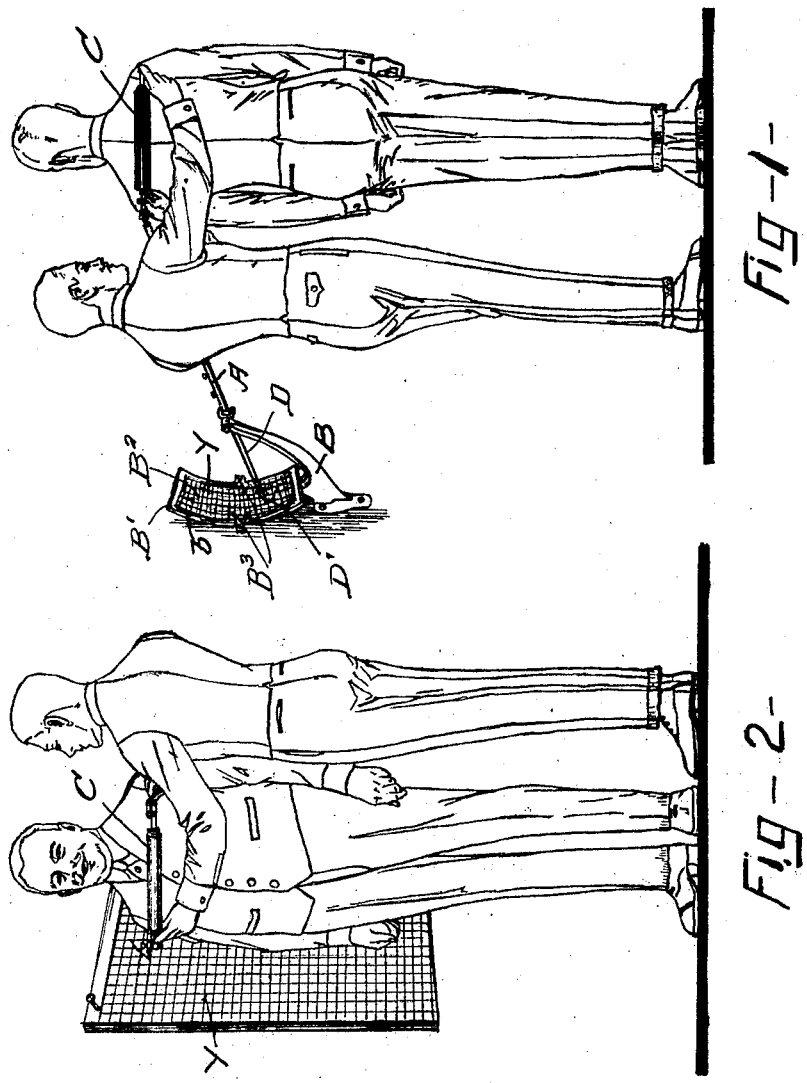

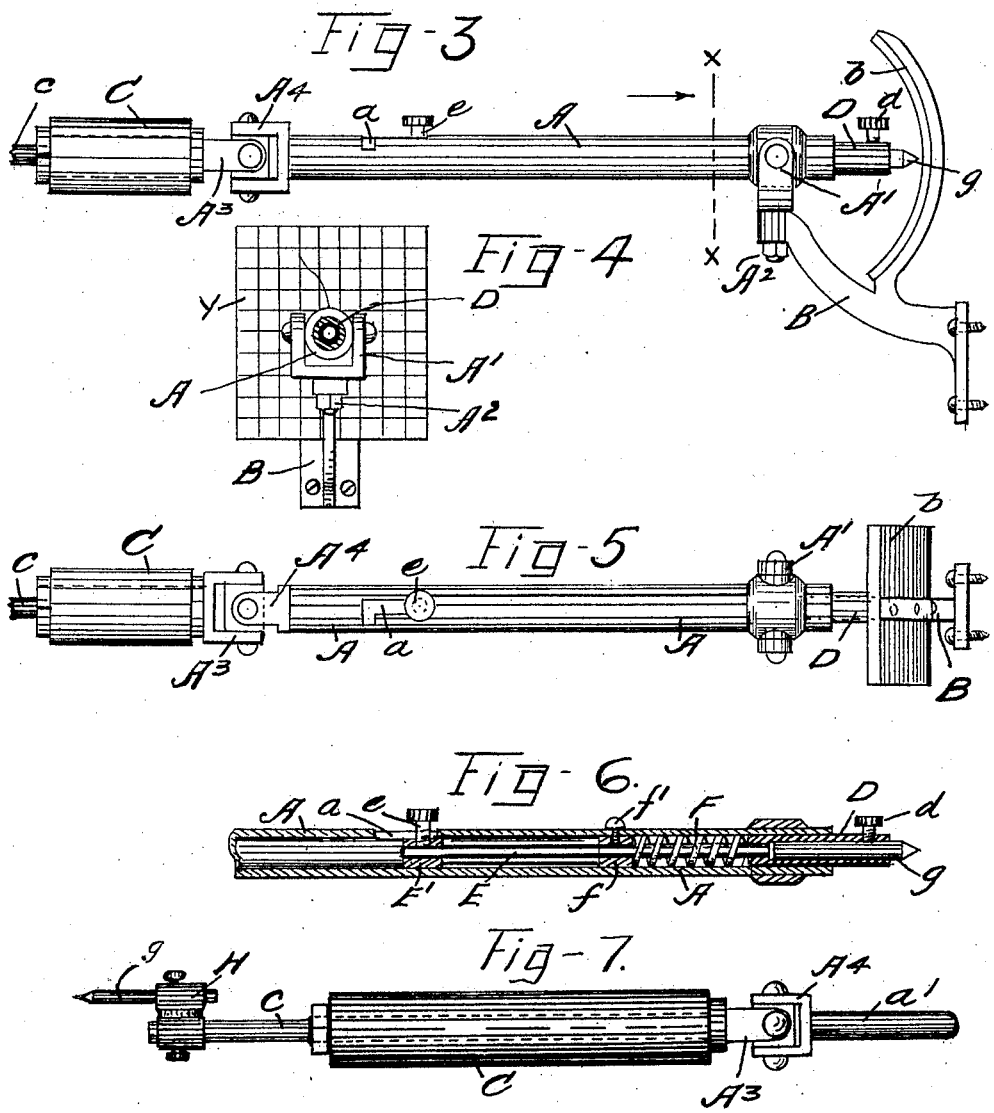

FRANK W. WODRICH, OF EVANSTON, ILLINOIS.

FORMOGRAPH.

1,393,000.   Specification of Letters Patent.   Patented Oct. 11, 1921.

Application filed August 30, 1917. Serial No. 188,930.

*To all whom it may concern:*

Be it known that I, FRANK W. WODRICH, a citizen of the United States, residing at Evanston, in the county of Cook and State of Illinois, have invented certain new and useful Improvements in Formographs, of which the following is a full, clear, and exact description, such as will enable others skilled in the art to which it appertains to make and use the same, reference being had to the accompanying drawings, and to the letters of reference marked thereon, which form part of this specification.

The main object of the invention resides in the provision of simple and efficient apparatus for graphically recording contours and dimension characteristics of bodies and relates particularly to apparatus for graphically recording contours and dimension characteristics of the human form. In its particular relation the invention is applicable to the medical science in producing graphic records for purposes of record and research, and to tailoring and kindred industries for graphically recording the contours and dimension characteristics of the person to be fitted. In this latter relation the invention may be used as a substitute for the usual measuring method or may be used supplementally therewith. When used in either way the invention possesses numerous advantages over the usual method, such as recording with accuracy the individual characteristics both as to location and dimension with a very small expenditure of time.

Another object of the invention resides in providing a device of the above described character which may be used either to produce a record on a different scale relatively to the object, preferably on a reduced scale, or to produce a record full size, there being certain features of novelty in the device used in either adaptation and in the provision of means whereby one surface traversing element is used in both adaptations.

Minor objects of the invention reside in the provision of apparatus of the above described character which especially adapts the device to the particular relations above recited without departing from the simplicity of the same, all of which are directed toward rendering the device as accurate and convenient as possible.

With these and other objects in view my invention consists in certain features of novelty in construction, combination and arrangement of parts by which the said objects and certain other objects hereinafter appearing are attained, all as fully described with reference to the accompanying drawings, illustrating the preferred embodiment of the invention, and more particularly pointed out in the claims.

In the drawings:—

Figure 1 is a perspective view showing the device in use and recording on a reduced scale;

Fig. 2 is a perspective view showing the device as used in another manner to record in full scale.

Fig. 3 is a side elevation of the apparatus.

Fig. 4, a front detail in part in transverse section taken on the line X X of Fig. 3.

Fig. 5, a top plan of the apparatus.

Fig. 6, a detail in longitudinal section showing the operative arrangement of the recording device.

Fig. 7, a side view of the roller and its adjuncts when detached from the arm, for making full size diagrams.

To specifically describe the details of construction shown: A indicates a hollow arm pivotally connected to the fixed bracket B, by means of the universal joint marked $A'$ $A^2$.

C the roller carried by the shaft $c$ pivotally connected by universal joint $A^3$ $A^4$ to a plug $a'$ removably connected with the outer end of the arm A. D designates a pencil holder longitudinally movable within the arm A and fixed to the end of a rod E which passes through a fixed guide-block F and carries at its other end a movable block $E'$ to which it is secured by means of the set screw $e$.

F is a compression spring working around the rod E within the arm A and bearing against the inner end of the pencil holder D and the block $f$ which is fixed in position by the pin or screw $f'$.

The stem of the set-screw $e$ works within the L-shaped slot $a$ provided in the arm A and operates to regulate the tension exerted by the spring F on the pencil holder D and the limit of its outward travel; the tension of the spring being determined by the position in which the shaft E is fixed in the movable block E' and the limit of outward travel being determined by the slot. When the apparatus is not in service, the shaft E is retracted from the normal position shown in the several views by moving the screw $e$ in its slot to and within the angular portion thereof, which effects locking of the pencil out of operating position.

A chart holder B' is secured to the bracket B and is curved cylindrically on a horizontal axis passing through the axis of the universal joint A' A². This holder is adapted for holding a chart B² thereon in a corresponding curved form by means of clips B³. In operating the device as shown in Fig. 1 the person to be fitted or the object is stood opposite the chart B² in operative relation with the roller $c$ so that the pencil holder D passes over the chart D² as the roller C is rolled over the portion of the object which is to be recorded. The roller C is then brought into contact with any point of the portion of the object which is to be recorded, and the pencil holder D is released by moving the set screw $e$ out of the angular portion of the slot $a$ to allow the spring F, acting through elements hereinbefore described, to move said pencil holder D outwardly toward the chart B² to engage a pencil D', mounted at the outer end of the holder D, thereagainst. The roller C is then moved along the portion of the object to be recorded, which movement is recorded upon the chart by the pencil D', mounted on the one end of and moving under the control of arm A pivoted at the universal joint A' A², to the other end of which the roller C is connected.

By reason of the facts that the roller C is connected to the arm A by the universal joint A³ A⁴ and that the roller C has considerable width, the said roller may be maintained in a line perpendicular to the line of travel and perpendicular to the axis of the chart B² whereby the device may accurately record the highest points over a considerable area, which is advantageous in recording such parts of the body as the back of the shoulder blades. See Fig. 1.

It will be noted that the chart B² is curved only on one axis, $i.$ $e.$, a horizontal axis passing through the axis of the universal joint A' A², and that this axis is disposed at right angles to the longitudinal dimension of the person to be fitted or the object. By disposing the curve of the chart in this relation with the object the error upon the record made upon the chart, which arises due to the arm A assuming different angular positions to a plane passing through the universal joint A' A² at right angles to the axis of the curve of the chart as the roller C follows the contour of the object, is very slight because the range of the angular positions falls within acute angles on either side of said plane and may be disregarded or taken into consideration in determining lateral dimensions from the chart whereby it is unnecessary to provide spherically curved charts formed especially for the purpose.

When it is desired to use the member C as shown in Fig. 2, the shaft $c$ is disengaged from the arm A by withdrawing the plug $a'$ from its connection therewith, (see Fig. 7) and attaching to the outer end of the shaft the pencil holder H, which is radially disposed with reference to the axis of the shaft; the pencil $g$ being positioned longitudinally parallel with the periphery of the roller.

It will be noted that the connection between the pencil $g$ and the member C when assembled in either manner, as above described, moves the pencil in unison with the member C and maintains the pencil at one side of said member to permit the member C being moved along a surface of the object to be charted with said surface in perpendicular relation with the chart and with the pencil in contact with the chart thereby permitting the chart being supported from or adjacent to the wall of a room without inconvenience.

Modification of the exact details of construction, herewith shown, may be made in the apparatus without deviating from the intent and scope of my invention, and I therefore do not limit myself identically thereto.

What I claim as new and useful and desire to secure by Letters Patent, is:—

1. In an apparatus of the class described, a support, an arm having universal pivotal connection with the support and carrying at one end a surface-traversing member having universal pivotal-connection therewith, and at the other end means, coacting therewith, adapted to mark the contour lines indicated by the traversing member, substantially as set forth.

2. In an apparatus of the class described, a support, an arm having universal pivotal connection with the support; a shaft carrying a surface traversing device having universal pivotal connection with the free end of the arm; a marking device-holder operative from the other end of the arm and means carried by the arm for exerting tension on and controlling the limit of longitudinal travel of the marking device, substantially as set forth.

3. In an apparatus of the class described a bracket and record material-holder; an arm having universal pivotal connection with the bracket; a shaft, a surface traversing roller carried by the shaft, a plug having universal pivotal connection with the shaft and detachably carried by the free end of the arm, and a marking-device holder at the outer end of the roller shaft substantially as set forth.

4. In an apparatus of the class described, a support; a hollow-arm having universal pivotal connection with the support, a roller shaft and surface-traversing device having universal pivotal connection with one end of the arm; a rod slidably mounted within the arm, a marking-device holder at the other end of the arm fixed to said rod; a spring within the arm for exerting tension on the holder, and means for controlling the limit of travel of the marking device and for locking the same out of working position, substantially as set forth.

5. A device of the character described including a support, an arm, a universally pivotal connection between said support and said arm, a surface traversing member mounted on said arm and disposed thereon at a point distant from said pivotal connection, and a marking means mounted on said arm and disposed thereon at a point distant from said pivotal connection.

6. A device of the character described including a support, an arm, a universally pivotal connection between said arm and said support, a surface traversing member mounted on said arm and disposed thereon at a point distant from said pivotal connection, a marking means slidably mounted on said arm and movable toward and away from said pivotal connection and disposed at a point distant from said pivotal connection.

7. A device of the character described including a support, an arm, a universally pivotal connection between said support and said arm, a surface traversing member mounted on said arm and disposed thereon at a point distant from said pivotal connection, a marking means slidably mounted on said arm and movable toward and away from said pivotal connection and disposed at a point distant from said pivotal connection, and resilient means engaging said marking means and adapted to exert pressure upon said marking means to move the same in one direction on said arm.

8. A device of the character described including a support, an arm, a universally pivotal connection between said support and said arm, a surface traversing member mounted on said arm and disposed thereon at a point distant from said pivotal connection, a marking means mounted on said arm and disposed thereon at a point distant from said pivotal connection, and a chart supported in stationary relation with said support and curved on an axis substantially passing through the axis of said pivotal connection and adapted to be engaged by said marking means to record the movements of said surface traversing member.

9. A device of the character described including a support, an arm, a universally pivotal connection between said support and said arm, a surface traversing member mounted on said arm and disposed thereon at a point distant from said pivotal connection, a marking means slidably mounted on said arm and movable toward and away from said pivotal connection and disposed at a point distant from said pivotal connection, and a chart supported in stationary relation with said support and curved on an axis substantially passing through the axis of said pivotal connection and adapted to be engaged by said marking means to record the movements of said surface traversing member.

10. A device of the character described including a support, an arm, a universally pivotal connection between said arm and said support, a surface traversing member mounted on said arm and disposed thereon at a point distant from said pivotal connection, a marking means slidably mounted on said arm and movable toward and away from said pivotal connection and disposed at a point distant from said pivotal connection, a chart supported in stationary relation with said support and curved on an axis substantially passing through the axis of said pivotal connection and adapted to be engaged by said marking means to record the movements of said surface traversing member, and resilient means engaging said marking means and adapted to exert pressure upon said recording means to move the same in one direction on said arm against said chart.

11. A device of the character described including a support, an arm, a universally pivotal connection between said support and arm, a relatively wide surface-traversing member, a universally pivotal connection between said surface traversing member and said arm disposed at a point distant from said first mentioned pivotal connection, and a marking means mounted on said arm and disposed thereon at a point distant from said first mentioned pivotal connection.

12. A device of the character described including a support, an arm, a universally pivotal connection between said support and arm, a relatively wide surface traversing member, a universally pivotal connection between said surface traversing member and said arm disposed at a point distant from said first mentioned pivotal connection, a marking means slidably mounted on said arm and movable toward and away from said first mentioned pivotal connection and disposed at a point distant therefrom.

13. A device of the character described including a support, an arm, a universally pivotal connection between said support and arm, a relatively wide surface traversing member, a universally pivotal connection between said surface traversing member and said arm disposed at a point distant from said first mentioned pivotal connection, a marking means slidably mounted on said arm and movable toward and away from said first mentioned pivotal connection and disposed at a point distant therefrom, and resilient means engaging said marking means and adapted to exert pressure upon said marking means to move the same in one direction on said arm.

FRANK W. WODRICH.

Witnesses:
FRANK A. CAMSKY,
GEO. W. LE VIN.